United States Patent [19]

Craven et al.

[11] Patent Number: 5,082,701
[45] Date of Patent: Jan. 21, 1992

[54] MULTI-DIRECTIONAL, LIGHT-WEIGHT, HIGH-STRENGTH INTERLACED MATERIAL AND METHOD OF MAKING THE MATERIAL

[75] Inventors: Paul t. Craven, North Scituate; Richard A. Fisher, Providence, both of R.I.

[73] Assignee: Quadrax Corporation, Providence, R.I.

[21] Appl. No.: 130,854

[22] Filed: Dec. 9, 1987

[51] Int. Cl.⁵ .............................................. A47G 19/22
[52] U.S. Cl. ................................... 428/34.5; 428/36.1; 428/225; 428/226; 428/229; 428/240; 428/242; 428/257; 428/258; 428/259; 428/408; 428/402; 428/268
[58] Field of Search ............... 428/225, 232, 229, 294, 428/215, 36, 408, 902, 228, 226, 34.5, 36.1, 240, 242, 257, 258, 259, 268

[56] References Cited

U.S. PATENT DOCUMENTS

| | | | |
|---|---|---|---|
| 2,162,598 | 6/1939 | Atwood | 49/81 |
| 2,454,146 | 11/1948 | Ezbelent | 139/13 |
| 3,439,865 | 4/1969 | Port et al. | 229/53 |
| 3,466,219 | 9/1969 | Schwartz | 161/57 |
| 3,526,565 | 9/1970 | Walter | 428/294 |
| 3,673,035 | 6/1972 | Whitney | 156/164 |
| 3,719,210 | 3/1973 | Emerson et al. | 139/13 |
| 3,755,060 | 8/1973 | Bullock | 428/294 |
| 3,769,144 | 10/1973 | Economy et al. | 423/447 |
| 3,796,627 | 3/1974 | Marzocchi | 161/143 |
| 3,871,413 | 3/1975 | Torii | 139/13 |
| 3,930,091 | 12/1975 | Lewis et al. | 156/181 |
| 3,946,127 | 3/1976 | Eisenmann et al. | 428/40 |
| 3,953,647 | 4/1976 | Brennen et al. | 428/295 |
| 3,974,313 | 8/1976 | James | 161/70 |
| 4,030,892 | 6/1977 | Mendelsohn et al. | 428/226 |
| 4,216,856 | 8/1980 | Moring et al. | 198/847 |
| 4,316,933 | 2/1982 | Fraser | 428/295 |
| 4,318,948 | 3/1982 | Hodgson | 422/68 |
| 4,412,854 | 11/1983 | Layden | 65/18.1 |
| 4,599,256 | 7/1986 | Vasilos | 428/114 |
| 4,816,327 | 3/1989 | Binnersley et al. | 428/225 |

*Primary Examiner*—James J. Bell
*Attorney, Agent, or Firm*—Fleit, Jacobson, Cohn, Price, Holman & Stern

[57] ABSTRACT

Continuous flat unidirectional flat ribbons, which have been precut from an impregnated fiber reinforced-matrix composite tape so as to have a substantially greater width than thickness, are interlaced in over-and-under relationship in 0 degree and 90 degree directions into the form of a continuous, multi-directional seamless tube. The tube may be cut into tubular sections, which then are subjected to temporary heat and pressure so that the matrix fuses the interlaced ribbons to form an integral tube. The elongated seamless tube also may be cut into planar sections and used to form integral members of planar or contoured construction. The integral members may be formed of a single layer of the interlaced material, or of laminated construction form multiple layers of the interlaced material, with the ribbons of each layer either extending parallel, at an angle other than 0/90 degrees, aligned, or offset, with respect to the ribbons in the other layer(s). The formed members may have interlaced ribbons of different types and/or contain different types of fibers in different sections of the members, to provide the members with different structural characteristics.

36 Claims, 8 Drawing Sheets

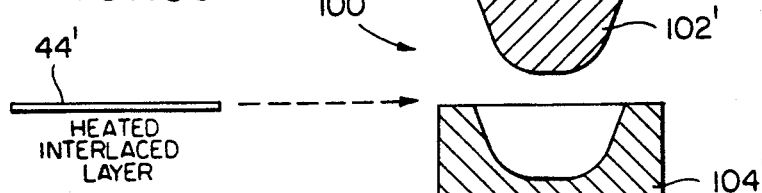
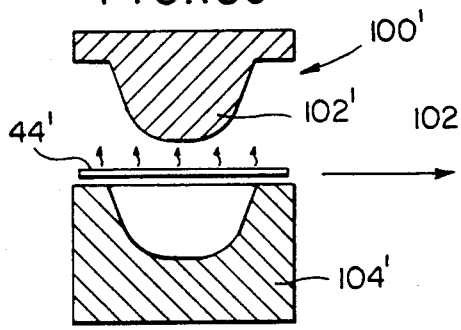
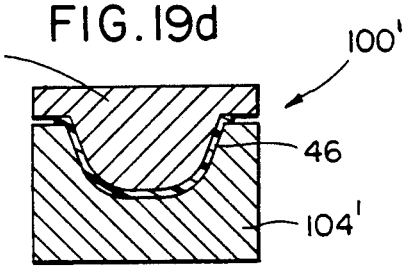
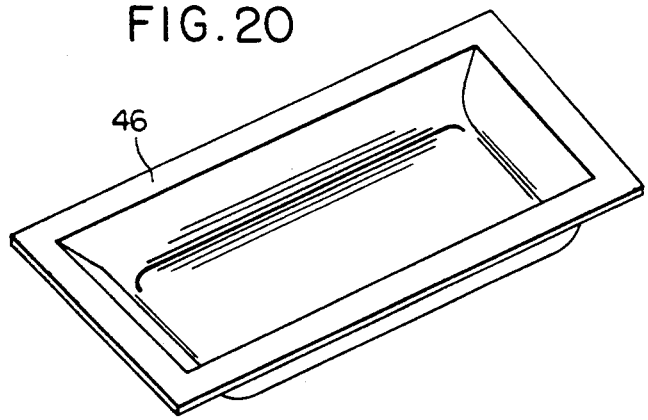
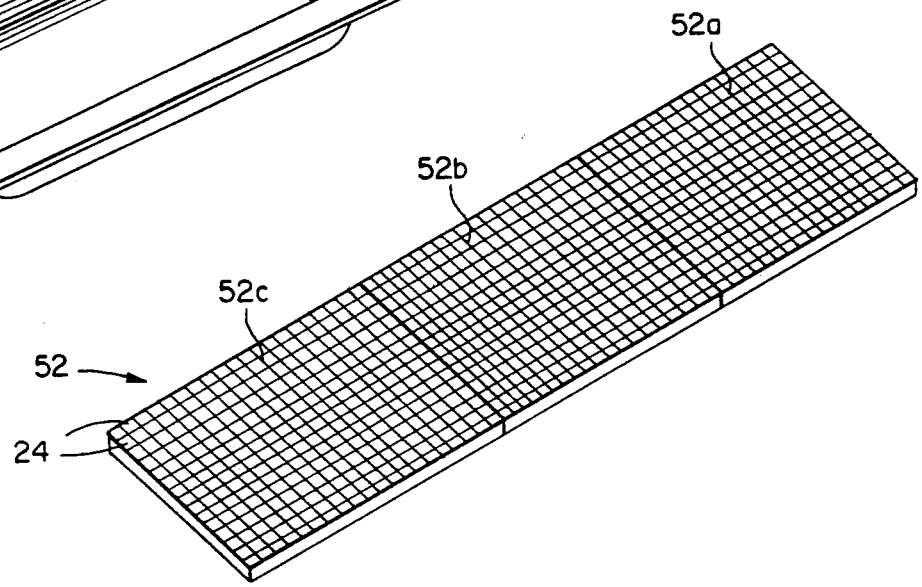

MULTI-DIRECTIONAL, LIGHT-WEIGHT, HIGH-STRENGTH INTERLACED MATERIAL AND METHOD OF MAKING THE MATERIAL

BACKGROUND OF THE INVENTION

1. Field of the Invention

This invention relates to a multi-directional, light-weight, high-strength interlaced material and method of making the material, and more particularly to a multi-directional, light-weight, high strength interlaced material suitable for use in or for structural members in military and commercial aerospace and aircraft applications, as well as other commercial applications.

2. Description of the Prior Art

In the past, high-strength structural members in military and commercial aerospace and aircraft applications, as well as other commercial applications, have normally been constructed of various types of metals. In recent years, there has been a trend toward the use of fiber-reinforced plastic composite materials for this purpose, because of their various advantages. For example, when compared to traditional structural metals such as steel, aluminum and titanium, fiber-reinforced plastic composites are lighter, easier to use, stronger, less expensive, less subject to corrosion and more impact resistant. By way of illustration, carbon fiber material impregnated with thermoplastic may be five times stronger than steel and 55% lighter than aluminum.

In general, fiber-reinforced plastic composites are formed by arranging continuous, light-weight, high-strength fibers, such as carbon, glass, boron, various high strength metals or various synthetic fibers, such as aromatic polyamides, and lesser strength fibers such as rayon or nylon, in side-by-side bundles or tows with the fibers extending longitudinally in one direction. The side-by-side fiber bundles or tows then are impregnated with a plastic matrix under simultaneous heat and pressure. Subsequently, the resultant fiber-reinforced plastic composite may be arranged in layers in sheet, or unidirectional tape, form which, when subjected to heat and pressure, form a fiber-reinforced plastic composite laminate.

Fiber-reinforced plastic composites are available in fiber-reinforced thermoset matrices or fiber-reinforced thermoplastics matrices. Fiber-reinforced thermosets are epoxy, vinylester or polyester-based, harden through an irreversible catalytic process and require a long curing cycle as part of the process through which they are fabricated into finished parts. Prior to use, fiber reinforced thermosets have delicate shelf-life properties and require refrigeration. When cured, fiber-thermosets are strong and light-weight, but often brittle.

Fiber-reinforced thermoplastics, on the other hand, are a newer form of composite which, compared to fiber reinforced thermosets, have significantly higher toughness and impact resistance, are processed at and can tolerate higher temperatures and have improved moisture and chemical resistance. Fiber-reinforced thermoplastics do not require refrigeration, have an unlimited shelf life and require only a short heat/cool cycle for curing. Unlike fiber-reinforced thermosets, fiber reinforced thermoplastics are not hardened through a catalytic process and therefore can be reheated and reformed without undue detrimental effect, although they do require higher temperatures than fiber-reinforced thermosets to process them into finished parts. Further, fiber-reinforced thermoplastics tend to be stiff and boardy, and therefore generally are unable to conform to highly contoured molds at room temperature.

Fiber-reinforced thermoset composite unidirectional tapes have been used extensively for high strength structural aerospace/aircraft applications because all fibers, and therefore all the structural attributes of the material, are aligned in one direction. (To date, however, the processing of these tapes into finished parts has been too expensive for most commercial applications.) Unidirectional tapes are laid in successive laminated layers at predetermined angles, to obtain the desired structural properties in a finished format of greater dimensions than the individual tapes. An example of such laminated fabrication is shown in U.S. Pat. No. 3,946,127, to J. R. Eisenmann et. al. Normally, the unidirectional tapes are processed by hand; however, for some larger parts, complex automated tape laying machines, having a cost on the order of one to three million dollars, may be used, although such machines for processing fiber-reinforced thermoplastic composite unidirectional tapes are still in the development stages.

Fabrication of parts from fiber-reinforced thermoplastic composite unidirectional tapes has followed the labor-intensive processes developed for fiber-reinforced thermoset composite unidirectional tapes. Fiber-reinforced thermoset tapes, however, are more suitable for these hand processes because, unlike fiber-reinforced thermoplastic tapes, they can be fabricated so that they remain tacky until cured and thus can be more easily held in position, whereas hand lay-up of fiber-reinforced thermoplastic tapes requires that each tape be tacked, welded or stitched in position before laying the next tape.

Thus, a particular need exists for a light-weight and high-strength fiber-reinforced composite material which covers large areas economically without loss of the structural characteristics of unidirectional tapes and which can be fabricated automatically in a rapid, efficient and inexpensive manner.

Accordingly, a primary purpose of this invention is to provide a new and improved multi-directional, light-weight and high-strength fiber reinforced plastic composite material of this type, wherein the unidirectional fiber-reinforced plastic tapes initially are interlaced in over-and-under relationship in a 0 degree/90 degree configuration. The interlaced material, which may be fabricated automatically in a machine known as a composite material interlacer, subsequently is subjected to heat and pressure in single or multiple layers to form an integral structure.

In general, the weaving or braiding of yarns, strips or ribbons of material in the forming of various types of parts is known in the art. For example, U.S. Pat. No. 2,162,598 to H. N. Atwood discloses the forming of a composite shatterproof window glass in which glass strips or ribbons are passed through or immersed in a molten plastic bath, subsequently braided, woven or interwoven into a fabric, and then subjected to heat and pressure to unite and bond the plastic-coated strips together. Similarly, U.S. Pat. No. 3,439,685 to M. I. Port et. al. discloses the weaving of flat plastic yarn and passing the woven yarn through heat rolls to bond the yarns slightly to prevent slippage therebetween.

U.S. Pat. No. 3,974,313 to V. L. James discloses an energy absorbing blanket comprising layers of cloth woven from tapes formed from glass filaments, an aromatic polyamide or other materials, in various patterns, so that the tapes of the layers can move relative to one another to absorb energy, e.g., of a projectile. U.S. Pat. No. 4,030,892 to L. I. Mendelsohn et. al. is directed to an electro-magnetic shield which may be woven from filaments including a glass metal alloy. U.S. Pat. No. 3,769,144 to J. Economy discloses a central layer of woven carbon cloth disposed between two outer reinforcing layers to form a quilted fabric for use in fabricating gas-impermeable protective clothing or gas masks. U.S. Pat. No. 4,412,854 to G. K. Layden concerns a method of producing a fiber-reinforced material by painting a thermoplastic polymeric binder, containing glass powder, on woven carbon cloth, drying the resultant sheet, cutting the sheet to produce a plurality of preforms of a desired shape, stacking the preforms in a mold, initially warm-molding the preform to form an intermediate article, and then hot pressing the intermediate article to form a final article.

It also is known to form tape yarns on a circular loom into a tubular member which may be used in that configuration, or may be cut longitudinally to form a sheet of planar material. For example, circular looms of this general type are shown in U.S. Pat. No. 2,454,146 to G. E. Ezbelent, U.S. Pat. No. 3,719,210 to P. D. Emerson et. al. and U.S. Pat. No. 3,871,413, to S. Torii.

Heretofore, however, the prior art has not provided a multi-directional, light-weight, high-strength fiber-reinforced plastic composite material which can be fabricated in a rapid, efficient and inexpensive manner, and which can be used for forming parts of tubular, planar or contoured configuration, and a primary purpose of this invention is to provide such a material and a method of making the material.

SUMMARY OF THE INVENTION

In general, in accordance with the present invention, a multi-directional, light-weight, high-strength material may be formed by providing a plurality of continuous tapes or ribbons comprised of continuous fibers which extend longitudinally essentially in only one direction and which have been impregnated with a plastic matrix to provide essentially uniform dispersion of the matrix between the fibers. Respective ones of the continuous ribbons, which have greater width than thickness, are interlaced into over-and-under relationship with other ribbons in the 0 degree and 90 degree directions to form a continuous tubular-shaped, multi-directional seamless material. The ribbons may be slit from a relatively wider impregnated tape, may be impregnated individually, or may be of a type otherwise formed individually, such as by extrusion or poltrusion.

The continous tubular-shaped interlaced seamless material may be cut into tubular sections of preselected lengths and each section subjected to temporary heat and pressure so that the plastic matrix fuses the interlaced warp and weft ribbons into an integral seamless tube. The continuous tubular-shaped interlaced material also may be cut in a 0 degree/90 degree configuration or an angle into a planar strip or planar sections and used to form integral members of planar or contoured construction. Articles or members may be formed from a single layer of the interlaced material, or may be formed of laminated construction from multiple layers of the material, with the 0 degree and 90 degree ribbons of each layer either parallel with, at an angle, aligned or offset with respect to the ribbons of the other layer(s). Preferably, the ribbons are formed so as to have a thickness of at least 2 mils so as to be of sufficient strength to withstand interlacing. The ribbons also preferably have a width of at least ⅛ inch so as to not be subject to overtwisting and so as to have a relatively flat, unkinked configuration when the ribbons are interlaced together. Ribbons having different types of reinforcing fibers or filaments, or metal ribbons, also may be interlaced into the material to provide different selected material characteristics.

BRIEF DESCRIPTION OF THE DRAWINGS

FIG. 8b is a series of cross-sectional photomicrographs of the material shown in FIG. 8a;

FIGS. 19a-19d are schematic views illustrating the use of a heated pressure mold for forming a planar section of the interlaced material into an integral member of contoured configuration;

FIG. 20 is a perspective view of the contoured member formed by the heated pressure mold of FIG. 19; and FIG. 21 is a schematic perspective view of a planar member formed from fiber reinforced plastic composite unidirectional ribbons containing different types of fibers.

DETAILED DESCRIPTION OF THE DRAWINGS

Figure 1:
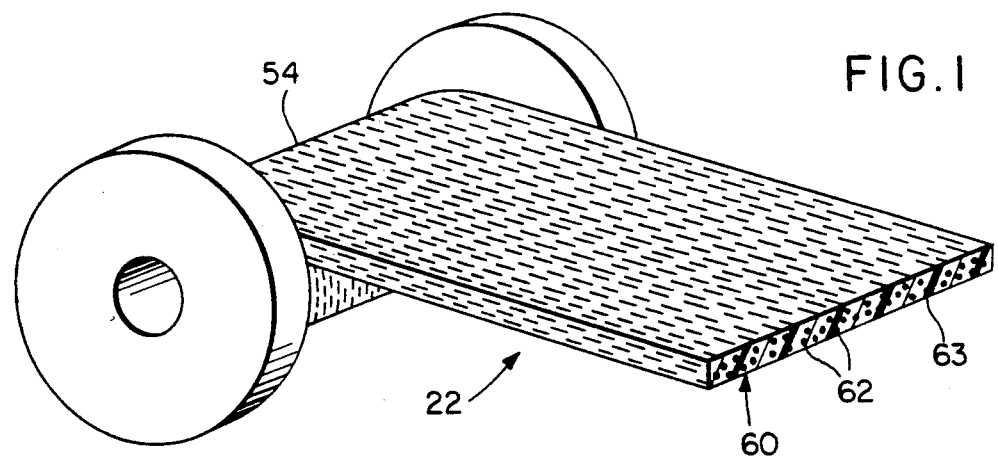
FIG. 1 is a perspective schematic view of a fiber-reinforced plastic composite tape which is used in practicing the invention.
Figure 2:
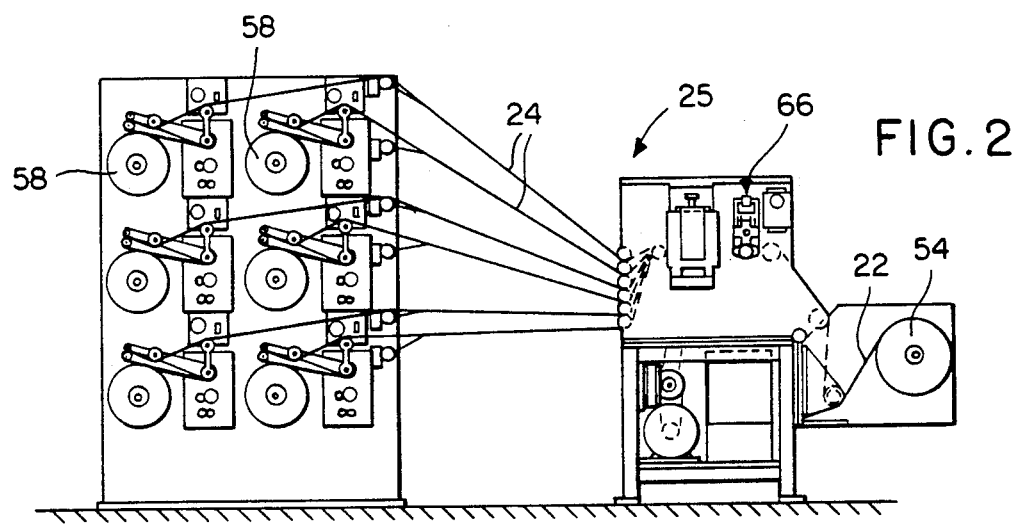
FIG. 2 is a schematic elevational view of a machine for the slitting and winding of fiber-reinforced plastic composite unidirectional ribbons from the tape shown in FIG. 1.

In general, the present invention involves initially slitting a fiber-reinforced plastic matrix-impregnate composite unidirectional tape 22 (for example, 4-12" wide), as illustrated in FIG. 1, into continuous unidirectional tapes or ribbons 24 of reduced width, in a machine 25 as shown in FIG. 2. The ribbons 24 then are interlaced in a machine 26 illustrated schematically in FIGS. 3-5, 9 and 10 into a continuous, multi-directional seamless tube 28 of interlaced material or fabric which is of uniform diameter along its length and which subsequently is cut and formed into members or articles of different shapes.

Figure 11:
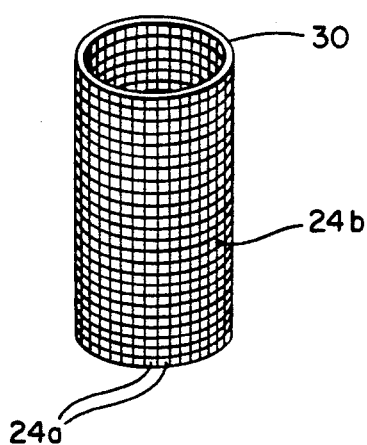
FIG. 11 is a perspective view of the interlaced tube section formed in FIG. 9.
Figure 12:
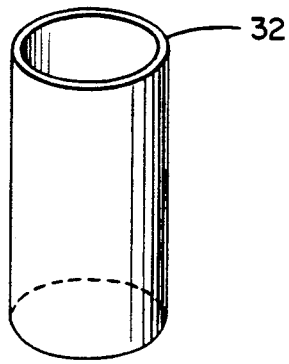
FIG. 12 is a perspective view of the interlaced tube section of FIG. 11 after having been subjected to temporary heat and pressure to form an integral tube.
Figure 13:
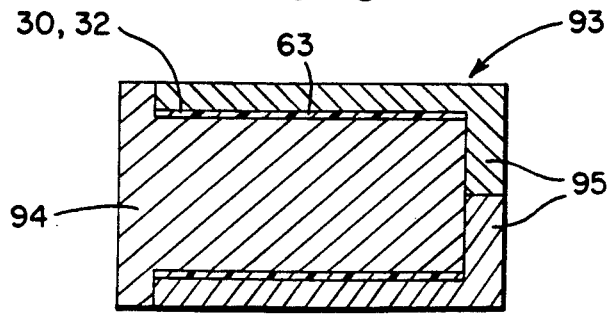
FIG. 13 is a schematic cross-sectional view of a heated pressure mold for forming the interlaced tube section of FIG. 11 into the integral tube of FIG. 12.
Figure 14:
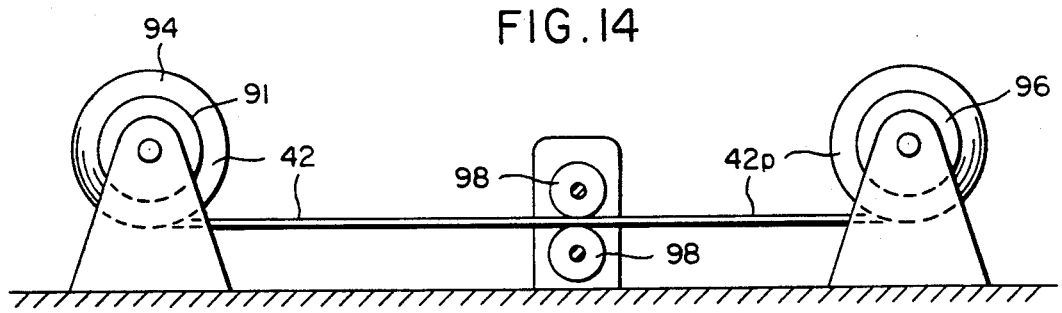
FIG. 14 is a schematic elevational view of a heated pressure roller mechanism for forming the elongated planar strip of the interlaced material formed in FIG. 10, into a material of integral planar construction.
Figure 15:
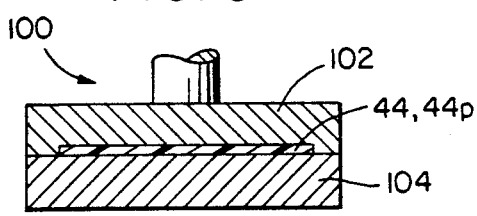
FIG. 15 is a schematic cross-sectional view of a heated pressure mold for forming a planar section of the interlaced material into a member of integral planar construction.
Figure 16:
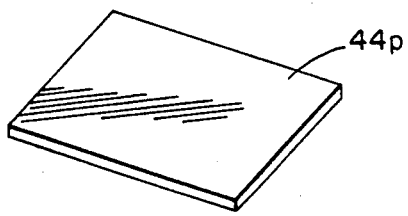
FIG. 16 is a perspective view of the planar member formed in FIG. 15.
Figure 17:
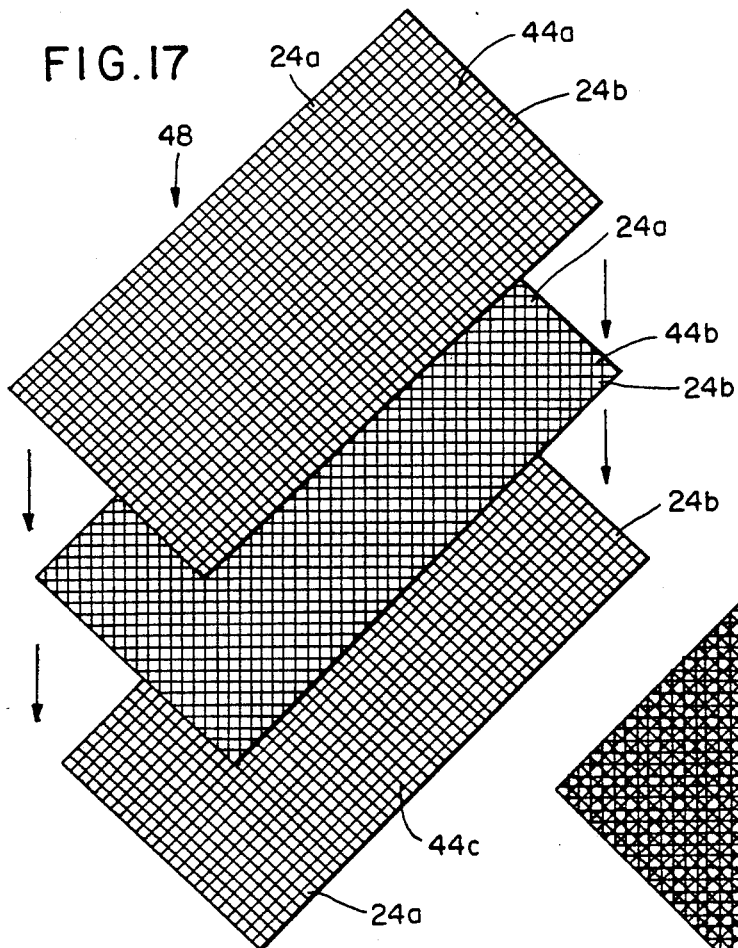
FIG. 17 is a perspective exploded schematic view illustrating a plurality of planar sections of the interlaced material prior to being formed into an integral laminated member.
Figure 18:
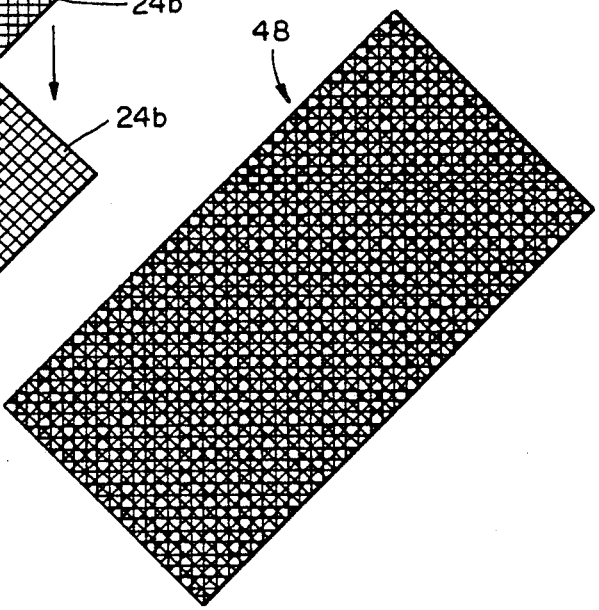
FIG. 18 is a view similar to FIG. 17 showing the planar sections of FIG. 17 after being formed into the integral laminated member.

For example, the interlaced seamless tube 28 may be cut transversely to form a tube section 30 of interlaced material of uniform diameter and a preselected length, as shown in FIG. 11, and the tube section then subjected to temporary heat and pressure, as illustrated in FIG. 13, to form a tube member 32 of integral construction as shown in FIG. 12. The interlaced seamless tube 28 also may be cut longitudinally or diagonally (i.e., on an angle) to form a continuous interlaced material strip 42 (FIG. 10), and then transversely to form a section 44 (FIG. 15), of the interlaced material of flexible, essentially planar construction. The strip 42 or section 44 then is subjected to temporary heat and pressure, as is illustrated in FIGS. 14 and 15, respectively, to form an essentially planar material 42p or member 44p (FIG. 16) of integral construction. In the alternative, a cut section 44' of the flexible interlaced planar material may be formed into an integral member 46 having a contoured configuration, as illustrated in FIGS. 19 and 20. The members 32, 42p, 44p, and 46 may be formed in a single layer configuration, or as a multilayer laminated member 48, as illustrated in FIGS. 17 and 18. Further, the interlacing of the ribbons 24 may be accomplished so that a resultant member 52 (FIG. 21) includes ribbons 24 containing fibers of different types, and/or different ribbon widths and/or different ribbon thicknesses, to provide different structural characteristics in preselected areas of the article.

It is contemplated that the invention may be practiced using either fiber-reinforced thermoplastic composites or fiber-reinforced thermoset composites. However, fiber-reinforced thermoplastic composites generally are preferred because many fiber thermoset composites, as presently manufactured, have a tacky surface consistency to facilitate hand lay-up, which makes them unsuitable for slitting and interlacing, although the tackiness of certain fiber-reinforced thermoset composites can be eliminated by appropriate stabilization of the end product in the manufacturing process. Even then, however, thermoset composites tend to be relatively soft and, as a result, have poor edge stability, so that dust particles tend to break off during the ribbon slitting operation and/or the resultant ribbons 24 tend to become damaged in the interlacing operation. In any event, both types of fiber-reinforced plastic composites may be used in practicing the invention, as noted previously.

Referring to FIGS. 1 and 2, initially the fiber-reinforced plastic composite ribbons 24 may be slit from a supply roll 54 of the fiber reinforced plastic matrix-impregnated tape 22 by the ribbon slitting machine 25 and wound up on respective take-up reels 58. The tape 22 is in the form of a side-by-side array of bundles or tows 60 (FIG. 1) of continuous fibers 62 extending longitudinally in only one direction, that is, unidirectional, which have been pre-impregnated under heat and pressure with a plastic matrix 63.

The fibers 62 are of a light-weight and high-strength type, such as carbon, glass, or synthetic fiber. For example, a presently preferred fiber-reinforced plastic composite tape 22 is formed of AS4 carbon fibers available from the Hercules Aerospace Company of Magna, Utah, which have been impregnated with a thermoplastic sold by the Imperial Chemical Company of England, under the tradename "PEEK" (polyether-ether etherketone). A presently preferred synthetic fiber is an aromatic polyamide manufactured by E. I. DuPont Company of Wilmington, Del., and sold under the trademark "Kevlar" particularly "Kevlar" 29, 49 and 149, impregnated with a thermoplastic sold by the Phillips Petroleum Company of Bartlesville, Okla., under the trademark "RYTON". Glass fibers which may be used are available from Pittsburgh Plate Glass Company of Pittsburgh, Pa. Other fiber reinforcements which may be used include metal fibers such as cobalt, boron or ceramic fibers (in a ceramic or other type matrix), or other synthetic fibers such as nylon or rayon. Similar composites can be achieved with the same or similar fiber reinforcements impregnated with thermosetting plastics, as for example, available from the Ferro Corporation, Composites Division, Culver City, Calif. Impregnation of the fiber reinforcements also can be accomplished by independent impregnators of fibers, such as Baycomp, a division of Bay Mills Ltd., Burlington, Ontario, Canada, and Polymer Composites Inc., of Winona, Minn.

The fiber-reinforced plastic composite tape 22 is slit by the ribbon slitting machine 25 parallel to the one direction in which the fibers of the tape extend so that the slit ribbons 24 also are unidirectional, as noted above, that is, the continuous fibers thereof extend longitudinally of the ribbons. Accordingly, the resultant ribbons 24 have extremely high tensile strength in a longitudinal direction, but substantially limited tensile strength in a transverse direction. After being interlaced, however, the unidirectional ribbons 24 retain their individual structural characteristics, and cooperate to provide these same structural characteristics, including high tensile strength, to the resultant material in both the longitudinal and transverse directions of the interlaced material.

It is very important in the present invention that the unidirectional ribbons 24 be slit to a substantial width with respect to their thickness so that when the ribbons are interlaced, they resist overtwisting and produce an essentially fat "unkinked" interlaced configuration.

Otherwise, the ribbons 24 tend to behave like yarns of circular cross section, which, when interlaced, tend to twist in excess of 90° and/or have an undulating, "knuckled", or "kinked" configuration. Such results should be avoided in the present invention since they produce material having a nonuniform surface, destroy the surface integrity of the fibers 62, and reduce the tensile strength of the ribbons in a longitudinal direction. Further, certain ribbons containing higher modulus reinforcement fibers, such as carbon, also may snap if twisted under stress, requiring stopping of the machine 26 and splicing of the ribbon broken ends, with uncertain consequences regarding the structural integrity of the interlaced material. Accordingly, the ribbons 24 preferably have a thickness of at least 2 mils so as to have sufficient strength to withstand interlacing, and a width of at least $\frac{1}{8}$ inch to avoid overtwisting during the interlacing operation.

Further, the maximum thickness of the ribbons 24 is dependent primarily on the maximum ribbon thickness which can be thoroughly impregnated by the matrix 63, presently considered to be about 0.150 inch. It also is contemplated that ribbons 24 of up to about 3 inches in width can be fabricated by constructing an interlacing machine 26 which is sufficiently rugged to process ribbons of this size over an extended period. Preferably, the thickness of the ribbons 24 is in a range on the order of about 6 to about 40 mils, with a ribbon width on the order of about $\frac{1}{8}$ to about $\frac{1}{2}$ inch. Most preferred, however, is a ribbon thickness in a range of about 6 to about 18 mils, with a ribbon width in a range on the order of about 3/16 to about $\frac{3}{8}$ inch, based on various factors, such as preserving hinging at ribbon cross-over points, efficient manufacturing rate and ease of subsequent formability.

The slitting-and-winding machine 25 may be of any suitable type, such as that available from the Independent Machine Company of Fairfield, N.J. Thus, as shown in FIG. 1, the machine 25 comprises the tape supply roll 54 and a slitting mechanism 66 provided with a series of knives (not shown in detail) adjustable to different spacings for cutting ribbons 24 of different widths. As the fiber-plastic matrix-impregnated composite tape 22 is advanced through the machine to the left in FIG. 2, the knives of the slitting mechanism 66 slit the tape to form a plurality (e.g., five in FIG. 2) of ribbons 24. Further, since an entire width of the tape 22 normally cannot be slit at one time, the remaining unslit width portion of the tape is wound up on one of the takeup reels 58 for future use as a new supply reel "54".

After the ribbons 24 have been slit and wound on the take up reels 58, the reels are transferred to the interlacing machine 26, which is of a type capable of interlacing the ribbons, which are flexible, but stiff and boardy in nature. For example, the machine 26 may be of a circular type as disclosed in copending patent application Ser. No. 738,461, filed May 28, 1985, in the name of Joseph E. Brais, which is exclusively licensed to the assignee of the subject application, and the subject matter of which, to the extent not inconsistent with this disclosure, is hereby incorporated by reference.

Figure 3:
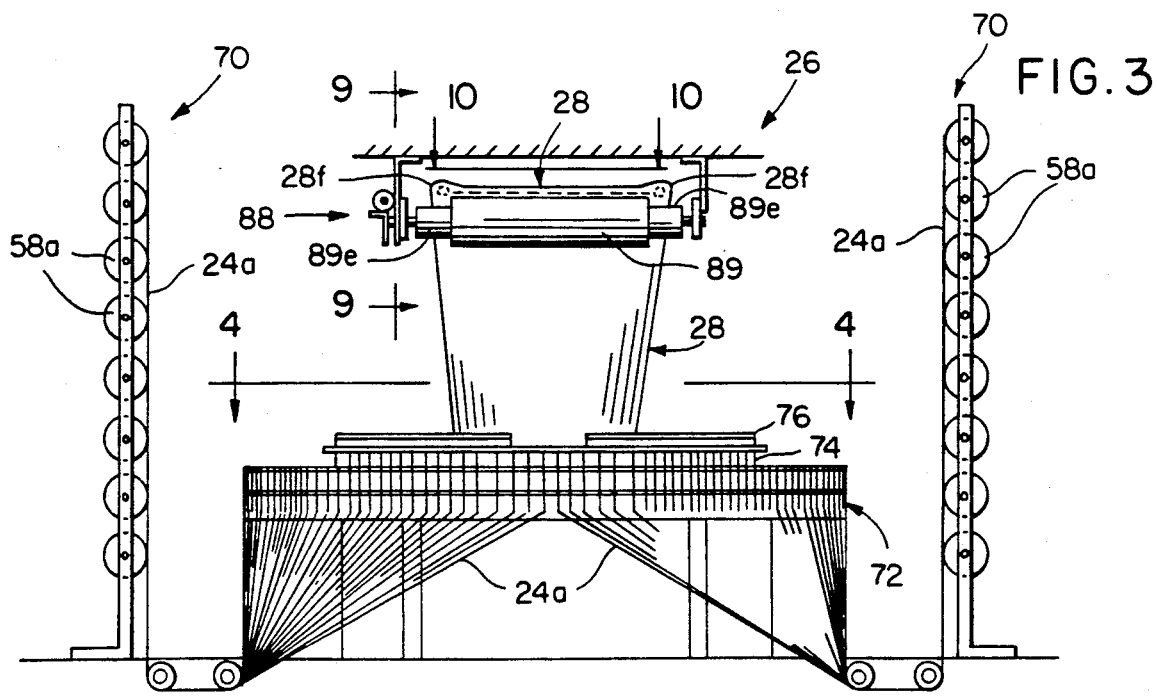
FIG. 3 is a schematic elevational view of a machine for interlacing the unidirectional ribbons produced by the machine of FIG. 2, into a multi-directional, fiber reinforced plastic composite seamless tube in accordance with the invention.

In this regard, referring to FIG. 3, a plurality of the reels 58, designated 58a and containing 0 degree ribbons 24a, are mounted in supply stands 70 (only two shown) about the periphery of the circular machine 26, which includes a fixed support table 72 and a continuously rotating table 74 comprising one or more shuttles 76 (best shown in FIG. 4), each of which also carries one of the reels 58, designated 58b and containing a supply of 90 degree ribbon 24b. The 0 degree ribbons 24a are suitably guided, under tension and without excessive twist, to vertically extending positions, as clearly disclosed in FIGS. 4 and 5, adjacent a cylindrical vertical forming surface 80 (shown only in FIG. 4) of a cylinder 82 about which the table 74 and the shuttles 76 rotate. More specifically, the 0 degree ribbons 24a are brought into engagement with the vertical forming surface 80 in tightly abutted relationship about an annular guide ring 84 disposed about the cylinder 82.

Figure 4:
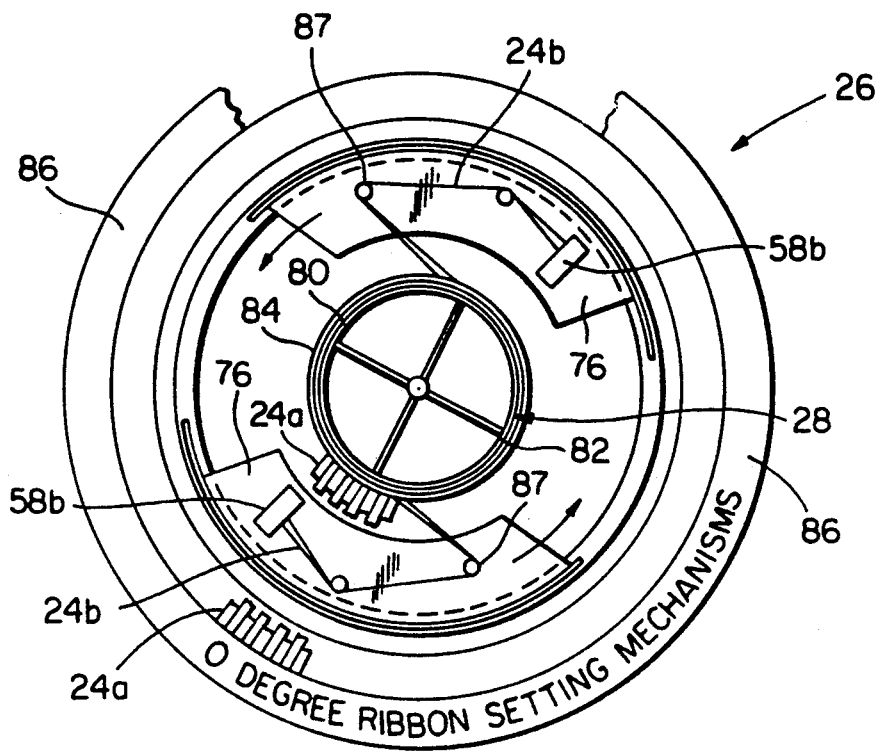
FIG. 4 is a schematic cross-sectional view taken along the line 4—4 in FIG. 3.
Figure 5:
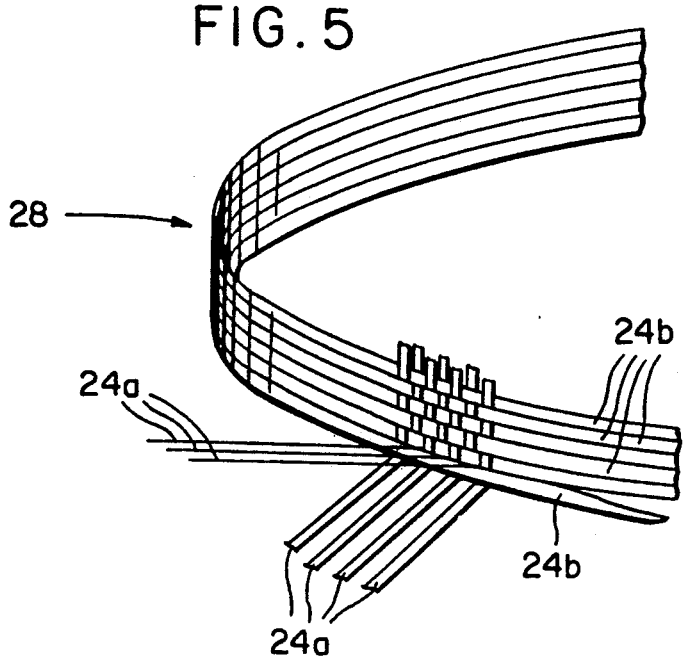
FIG. 5 is a perspective view of a portion of the material as it is being interlaced in the machine illustrated in FIGS. 3 and 4.

For each pass of one of the shuttles 76, each of the 0 degree ribbons 24a is preset into an upper or lower position with respect to the approaching shuttle by a respective one of a plurality of 0 degree ribbon setting mechanisms 86, depending on the interlacing pattern being used, to define a 0 degree ribbon shed. The next rotating shuttle 76 then passes through the 0 degree ribbon shed defined by the 0 degree ribbon setting mechanism 86, and lays the 0 degree ribbon 24b on that shuttle, under tension and without twist, against the 0 degree ribbons 24a at the cylindrical vertical forming surface 80, as is best shown in FIG. 5. In the disclosed interlacing machine 26, this is accomplished by the 90 degree ribbon 24b passing from the 90 degree supply reel 58b about vertical guide posts 87 on the shuttle 76, and then horizontally under a lower surface of the guide ring 84, after which the ribbon turns 90° and becomes laid into vertical engagement with the portions of the 0 degree ribbons 24a behind the guide ring, as illustrated in FIGS. 4 and 5. As the shuttle 76 then clears each of the 0 degree ribbons 24a, the 0 degree ribbon is again preset, if necessary, for the next shuttle pass.

As the shuttles 76 rotate to form the interlaced ribbon tube 28, the tube is advanced vertically upward in increments corresponding to one 90 degree ribbon width by a take up mechanism 88 (FIG. 3), for the laying of the next 90 degree ribbon pass into the 0 degree ribbons 24a in tightly abutted relationship with the preceding 90 degree ribbon. Thus, as is clearly shown in FIG. 5, the 90 degree ribbon 24b is interlaced with the 0 degree ribbons 24a in over-and-under symmetrical relationship with respect to a circular plane of the interlaced material tube 28 and in a continuous smooth helically extending path, with the 90 degree ribbon extending across the 0 degree ribbons at a slightly inclined angle (i.e., approximately, but slightly less than, perpendicular, and thus also at a slightly inclined angle to the axis of the interlaced material tube) and with engaged mating surface portions of the 90 degree and 0 degree ribbons disposed in the circular plane of the interlaced material tube. In this way, the interlaced ribbon tube 28 can be formed on a continuous basis to a preselected diameter.

Figure 6:
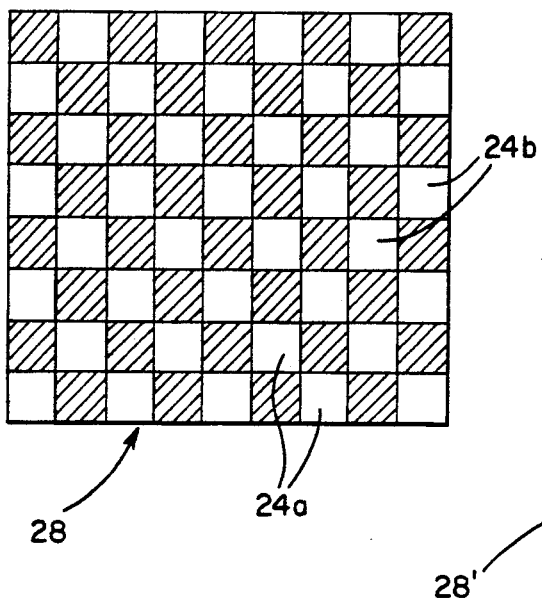
FIG. 6 is a partial plan view of a portion of a multi-directional, interlaced material in accordance with the present invention.
Figure 7:
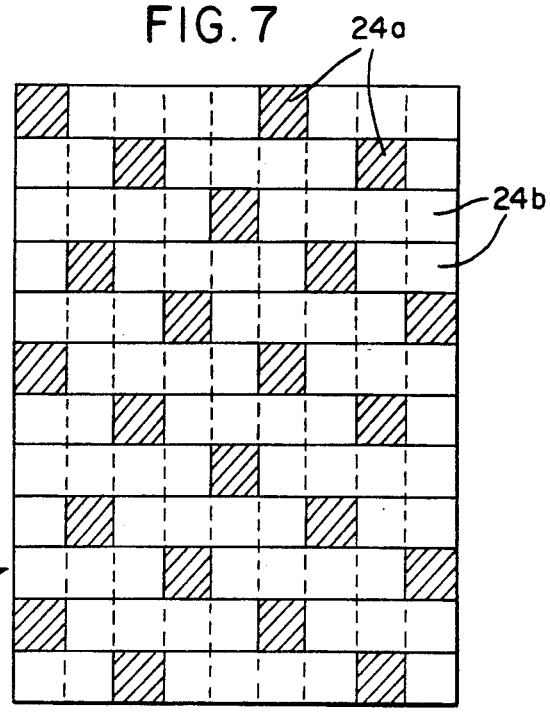
FIG. 7 is a view similar to FIG. 6 and illustrating an alternate interlaced configuration.

Referring to FIG. 6, in forming the tube 28, the fiber-reinforced plastic composite ribbons 24a and 24b may be interlaced in tightly abutted relationship into a plain over-and-under pattern, in which each ribbon passes over and then under alternating ones of the ribbons extending approximately perpendicularly thereto. (In FIG. 6, "over" 0 degree ribbons 24a are shaded and "under" 0 degree ribbons are unshaded). In the alternative, other interlaced patterns also may be used. For example, FIG. 7 illustrates an interlaced pattern for a tube 28' in which each ribbon 24a and 24b passes over four other ribbons extending approximately perpendicularly thereto, then under one of the ribbons perpendicular thereto, and then over four more of the ribbons perpendicular thereto, etc., to form a "five-harness interlace" in which the ribbons clearly have edges that are abutting substantially throughout the interlaced material or fabric. (In FIG. 7, "over" 0 degree ribbons 24a are shaded and "under" 0 degree ribbons are unshaded; on the opposite side of the material, the pattern is reversed). The pattern of FIG. 7 enables the ribbons 24a and 24b to be interlaced in a flatter configuration then the interlaced ribbons in the pattern of FIG. 5, which can be advantageous from the standpoint of greater flexibility and ability to conform the interlaced material to contoured mold surfaces, and improved structural characteristics (e.g., tensile, compressive and shear strength) of the final product.

Further, while in FIGS. 6 and 7, the ribbons 24a and 24b are shown as being of uniform width, the ribbons may be of different widths, depending upon the intended use and desired characteristics of the interlaced material. Increasing the width of the 90 degree ribbons 24b also is advantageous from the standpoint of increasing the rate at which the interlaced material can be fabricated. Decreasing the width of the ribbons (either the 0 degree or 90 degree, or both) is advantageous from the standpoint of the ultimate formability of curved finished parts, such as the contoured member 46 in FIG. 20.

Figure 8A:
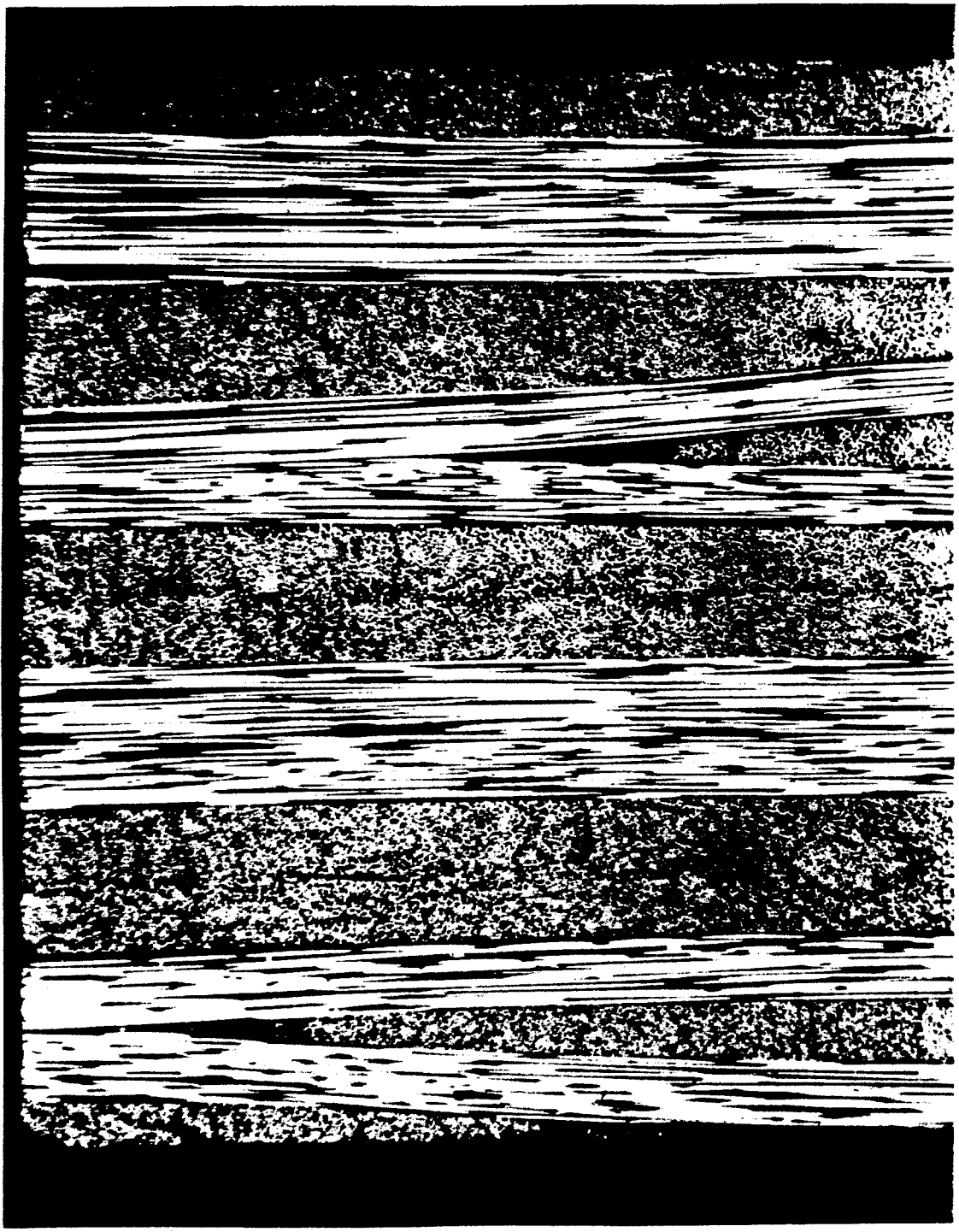
FIG. 8a is a photomicrograph, in cross-sectional view, of an 8-ply material formed from a plurality of superimposed layers of material having an interlaced configuration as shown in FIG. 7, after being subjected to temporary heat and pressure.
Figure 8B:
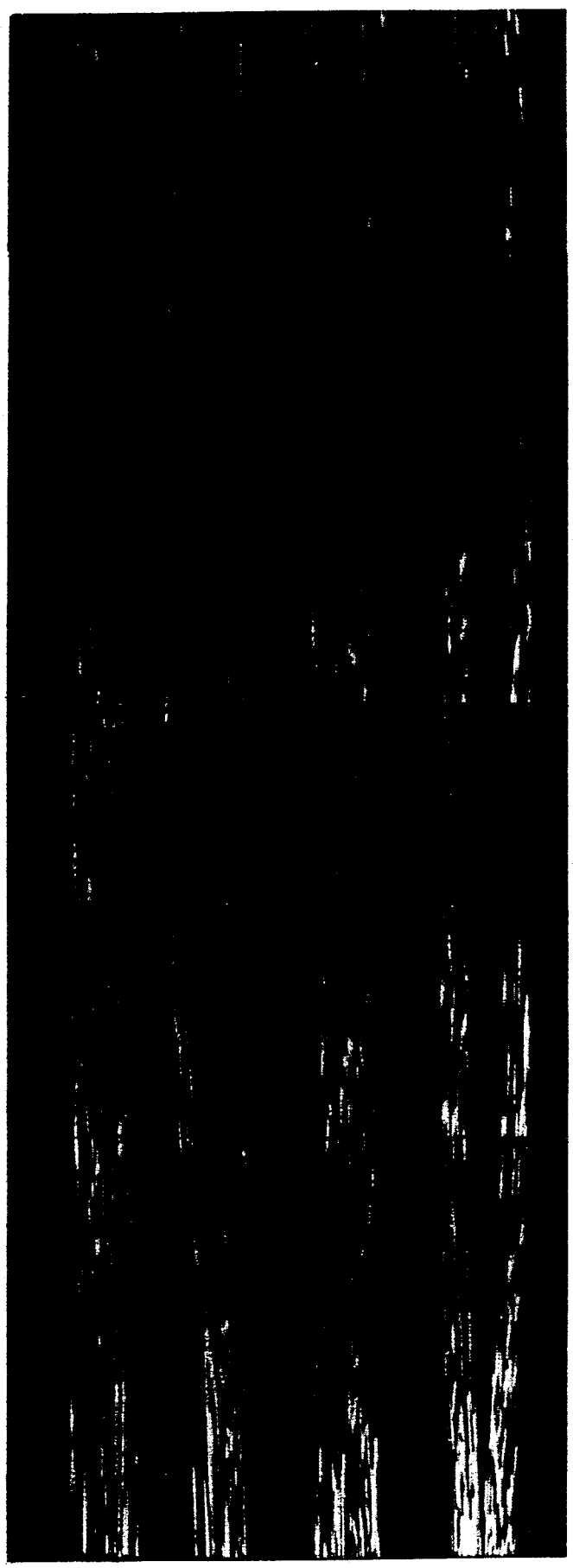

The photomicrographs of FIGS. 8a and 8b are a cross-sectional view and a series of continuous cross sections, respectively, of a 0/90 degree, 8-ply consolidated laminate of interlaced ribbons 24 formed from AS4 continuous carbon fibers (Hercules Aerospace) impregnated with a PEEK plastic matrix 63 (Imperial Chemical Company), enlarged 80 times as seen in FIG. 8a. The ribbons 24 had a thickness of approximately 6 mils and a width of 3/16 inch. As is best shown in FIG. 8a, the 90 degree oriented fibers 62 appear as numerous small essentially white circles directed at the viewer. The 0 degree oriented fibers 62 run across the page and are essentially white. The laminate was consolidated by means of a press applying heat and pressure simultaneously.

With further reference to FIG. 8a, the gray matter in which the 90 degree oriented fibers 62 are encapsulated is the PEEK plastic matrix 63. Matrix (resin) rich areas appear as solid gray with no white fibers. Voids, i.e., areas in which there is neither fiber 62 nor resin 63, appear as solid black areas. The darker colors which are interspersed in the 0 degree oriented fibers 62 resulted from an imperfect cross section cut, i.e., a cut at an angle other than exactly 0/90 degrees. The areas in which the 0 degree oriented fibers 62 "split" represents one of the 0 degree ribbons 24a rising over or under one of the 90 degree ribbons 24b.

The photomicrographs of FIGS. 8a and 8b also illustrate that the fiber alignment of each ply is very straight, which is critical for maintaining the structural characteristics of the unidirectional ribbons 24a and 24b. In this regard, unlike composites woven from yarns of circular or essentially circular cross section, there is minimal "knuckle" or "kinking" to disrupt structural integrity.

In summary, with respect to FIGS. 8a and 8b, it is seen that, as a result of pre-impregnation of the fibers 62 before further processing of the unidirectional material, there is substantially complete encapsulation and "wetout" of the individual fibers, with the fibers being maintained essentially straight within their respective individual ribbons 24a and 24b. This is in contrast to a nonuniform fiber encapsulation or "wetout" which would be achieved by dipping, spraying or coating procedures after the material has been converted by conventional weaving, braiding, etc., in which the thermoplastic matrix 63 would be unable to penetrate the tightly packed fibers 62. Further, as a result of the interlaced ribbons 24 being of substantial width with respect to their thickness, no significant bending or kinking of the fibers 62 is produced at ribbon cross-over points so as to disrupt the straightness of the fibers. As a net result, the finished material has been found, unlike conventionally woven composite yarns and rovings, to retain, or actually improve, all of the structural characteristics of conventional structures currently formed from the laminated ribbons, with a significant increase in ease of fabrication, including substantially improved capability to form, and consequent reduction in fabrication expense.

Figure 9:
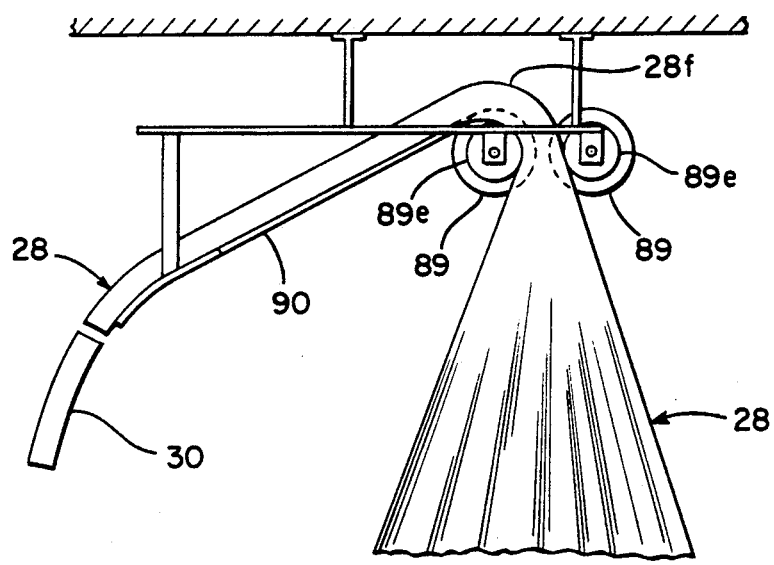
FIG. 9 is a side elevational view, as seen along the line 9—9 in FIG. 3, illustrating the cutting of the fiber-reinforced plastic composite seamless tube of FIG. 3 to form a tube section.

With reference to FIG. 3, the takeup mechanism 88 comprises a pair of opposed intermittently motor-driven pinch rolls 89 (only one shown in FIG. 3) having end portions 89e of reduced diameter so as not to crush or damage the stiff folded-over portions 28f of the seamless tube 28. Referring to FIG. 9, when it is desired to produce tubular sections of interlaced material, such as the tubular section 30 (also shown in FIG. 11), the seamless tube 28 may feed from the pinch rolls 89 onto a suitable conveyor or inclined plate 90, and subsequently be manually cut transversely into the tube section 30 to a desired length.

Figure 10:
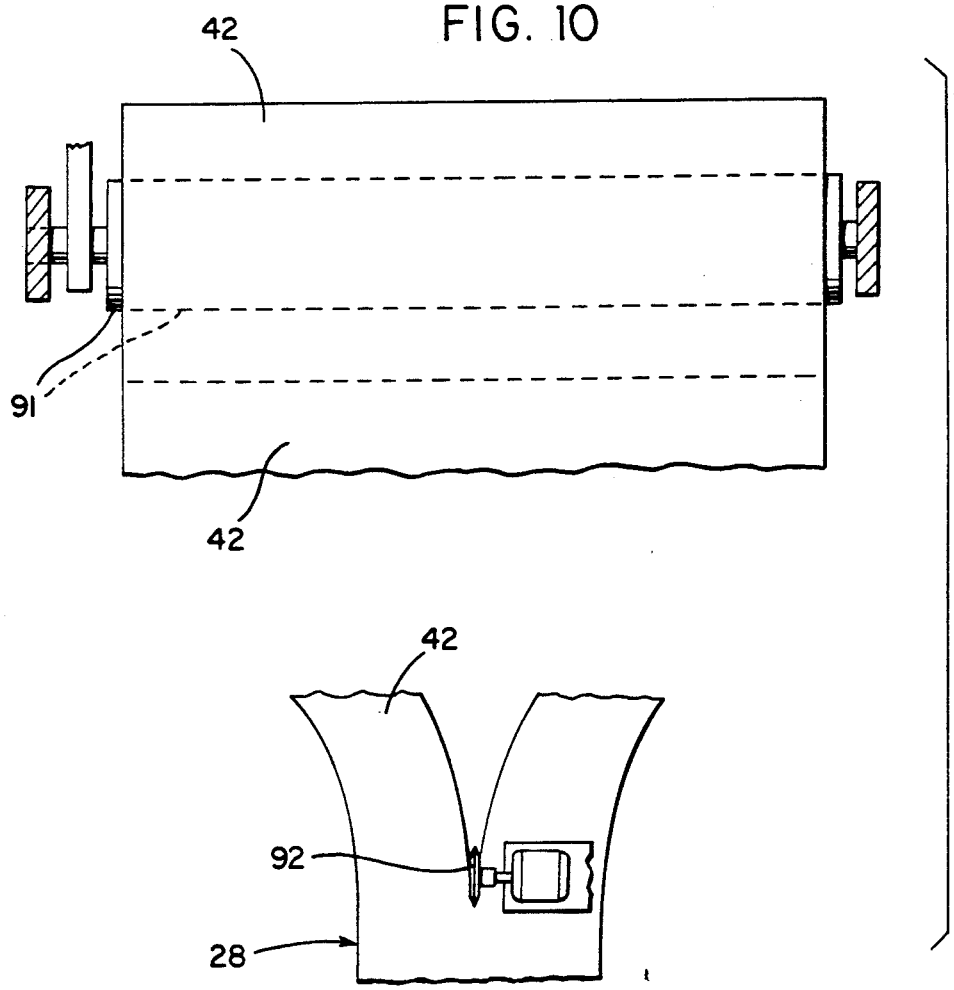
FIG. 10 is a partial plan view of the machine shown in FIG. 3, illustrating the cutting of the fiber-reinforced plastic composite seamless tube of FIG. 3 to form a planar strip.

With reference to FIG. 10, when it is desired to cut the seamless tube 28 into the planar strip 42, the tube is advanced from the pinch rolls 89 by a rotatably driven takeup cylinder or drum 91 past a motor-driven rotary knife 92, which cuts the tube longitudinally, to form the strip 42. As the strip 42 then proceeds to the takeup drum 91, the strip fans out into a planar configuration and then becomes wound up on the takeup drum.

After the continuous seamless tube 28 has been cut transversely to form the interlaced tube section 30 as shown in FIG. 9, the interlaced tube section is temporarily subjected to heat and pressure to cause the plastic matrix 63 to melt and then coalesce to fuse the interlaced ribbons 24a, 24b into the integral tube 32 shown in FIG. 11. For example, the interlaced tube section 30 may be placed in a heated pressure mold 93 comprising a telescoping inner mold member 94 and outer split mold members 95, as shown in FIG. 12. The mold members 94 and 95 then are temporarily heated under pressure to cause the desired melting of the plastic matrix 63, and permitted to cool so that the plastic matrix flows and forms the tube 32.

When the interlaced seamless tube 28 is slit longitudinally by the rotary cutter 92, to form the planar sheet 42 shown in FIG. 10, the sheet 42 also may subsequently be formed into the elongated planar sheet 42p of integral construction, by subjecting the interlaced sheet to temporary heat and pressure. For example, referring to FIG. 14, the interlaced planar sheet 42 may be passed from a supply roll 94 (e.g., transposed takeup drum 91) to a takeup 96, through a pair of opposed heated pressure rolls 98 for this purpose. In the alternative, the interlaced planar sheet 42 may be further cut longitudinally or diagonally, and then cut transversely, into sheet sections of desired sizes, as illustrated by the section 44 in FIG. 15. The sections 44 can then be formed into planar sheets of integrated construction, such as walls, panels, covers, etc., as illustrated by the member 44p in FIG. 16, by placing each cut section in a mold 100 comprising upper and lower heated pressure mold members 102 and 104.

Similarly, as is illustrated in FIG. 17, two or more interlaced planar sections 44a, 44b and 44c may be arranged in superimposed relationship and subjected to temporary heat and pressure to form the multiple layer, laminated member or structure 48 shown in FIG. 18. The 0 degree and 90 degree ribbons 24a and 24b in each of the sections or layers 44a, 44b and 44c may extend parallel to each other as illustrated by the layers 44a and 44c, or the 0 degree and 90 degree ribbons of at least one layer may extend at an angle other than the approximately 0/90 degrees to the ribbons in the other layer(s), that is, an angle which is greater than the slightly inclined angle at which the 0 degree ribbons extend with respect to the 90 degree ribbons in each layer, as illustrated by the layer 44b, so that the structure 48 has multi-directional strength in more than the approximately 0 degree and 90 degree directions. The 0 degree and 90 degree ribbons 24a and/or 24b in the different layers 44a, 44b and 44c also may be offset with respect to one another, and additional partial layer sections added at selected locations, as for example, to provide additional strength or reinforcement at those locations.

Referring to FIGS. 19a–19d and 20, a planar section 44' of interlaced material also may be subjected to temporary heat and pressure to form the tray member 46 of contoured construction in a pressure mold 100' having upper and lower heated mold members 102' and 104', respectively. In this regard, the individual fiber-reinforced plastic composite ribbons 24a and 24b, prior to being interlaced, while flexible, normally are relatively stiff and difficult to control during bending. When interlaced as shown in FIGS. 6 and 7, however, the interlaced ribbons 24a and 24b cooperate to hold one another together and provide a series of hinges in both 0 degree and 90 degree directions at successive ribbon cross-over points. Thus, the interlaced planar section 44' readily can be preheated, as shown in FIG. 19a, to a temperature slightly above the melting/softening point of the plastic matrix 63, placed in the heated mold 100', and the heated mold 100' slowly closed to form the contoured tray member 46 having lower curved edges and shown in FIG. 20.

Referring to FIG. 21, where it is desired that a member have different structural characteristics in different parts, it is considered to be within the purview of the invention to produce the member 52 wherein the interlaced ribbons 24a and 24b (FIGS. 6 and 7) in different parts 52a, 52b and 52c of the member contain fibers 62 (FIG. 1) of different types, where it is desired that the member have different structural characteristics in the different parts. Thus, in the forming of the interlaced seamless tube 28 (FIG. 3), by stopping the interlacing machine 26, selectively changing certain of the supply reels 58a and 58b, and splicing the new ribbons 24a and 24b thereon to the existing ribbons in the machine, the tube can be formed utilizing fiber reinforced plastic composite ribbons 24 containing different types of the fibers 62, at selected positions along the length of the tube. Subsequently, the thus formed interlaced seamless tube 28 is processed in a manner as above-described, to form the member 52 having the different fibers 62 in the respective portions 52a, b and c of the member, as illustrated in FIG. 21.

While the foregoing description has been directed primarily to the interlacing of fiber-reinforced plastic composite ribbons 24 of particular types, into certain interlaced configurations, it is considered within the purview of the invention that variations in the type of ribbons, fibers and the interlaced configuration may be used, depending upon the requirements and uses for which the material is intended. For example, the fibers 62 could be discontinuous fibers for certain applications, such as the forming of tubular pipes. Further, with reference to FIGS. 6 and 7, selected ones of the 0 degree ribbons 24a may be of different types than the other 0 degree ribbons and/or the 90 degree ribbons 24b. In this regard, the 90 degree ribbons 24b or certain of the 0 degree ribbons 24a may be of thin metal or a metal alloy formed by slitting, ribbons containing encapsulated metal filaments, such as that available from American Cyanimid, Polymer Products Division, Wallingford Conn., cast ribbons containing cobalt powder and available from Ribbon Technology, Inc. of Gahanna, Ohio, ribbons including encapsulated graphite in a nickel coating and available from Mitsubishi Metals of Japan, or other ribbons in the form of encapsulated metal filaments or metal powder. More particularly, all of the 0 degree ribbons 24a could be metal or metal containing ribbons interlaced with fiber-reinforced, electrically insulating plastic composite ribbons in a five harness array as shown in FIG. 7, or an eight harness array (wherein each ribbon passes over one and under seven other ribbons), respectively, to provide an electromagnetic shielding member formed primarily of metal on one side and primarily of electrically insulating composite material on the other.

In summary, a new and improved interlaced fiber-reinforced plastic matrix-impregnated composite material, in the form of the interlaced material tube 28, which may be used to make various types of light-weight members having high-strength characteristics and suitable for use in military and commercial aerospace and aircraft applications, as well as other commercial applications, and a method of making the material in a rapid and efficient manner, has been disclosed. The tube 28 may be cut into tubular sections 30, as shown in FIG. 11, and then subjected to temporary heat and pressure to form an integral tube 32 as shown in FIG. 12. The tube 28 also may be cut and formed into a continuous strip 42p, as shown in FIG. 14, or into planar sections 44 and used to form integral members 44p of planar construction, as shown in FIG. 16, or contoured members 46, as shown in FIG. 20. Planar sections, such as 44a, 44b and 44c, may be superimposed to form a multi-directional laminated structure 48 as shown in FIG. 18, and formed members may contain different types of fibers and/or ribbons, to provide different structural characteristics, as illustrated by the member 52 in FIG. 21.

It is to be understood that various other modifications, additions and alternative designs are, of course, possible in light of the above teachings. Therefore, it also should be understood at this time that within the scope of the appended claims, the invention may be practiced otherwise than as specifically described hereinabove.

What is claimed is:

1. A circular-machine-interlaced material of multi-directional, light weight, high-strength construction, which comprises:

a plurality of 0 degree and 90 degree elongated flat ribbons interlaced in over-and-under symmetrical relationship with respect to a plane of the material, with the ribbons having sets of respective opposed engaged flat surface portions disposed in the plane of the material and the 90 degree ribbons extending at a slightly inclined angle to the 0 degree ribbons;

at least some of the elongated 0 degree and 90 degree ribbons having continuous fibers extending in only longitudinal directions in said at least some 0 degree and 90 degree ribbons, respectively; and at least some of the 0 degree and 90 degree ribbons having been pre-impregnated with a matrix so that substantially all of the continuous fibers of the respective ribbons are encapsulated in the matrix and substantially the entire surface area of each of the opposed engaged flat surface portions of each set of said opposed engaged flat surface portions of the respective ribbons is coated with the matrix.

2. The material as recited in claim 1, wherein the matrix is a thermoplastic.

3. The material as recited in claim 1, wherein the matrix is a thermosetting plastic.

4. The material as recited in claim 1, wherein the matrix is a ceramic.

5. The material as recited in claim 1, wherein the ribbons have a thickness of at least 2 mils and a width of at least ⅛ inch, and the interlaced ribbons have an essentially flat, unkinked configuration.

6. The material as recited in claim 5, wherein the ribbons have a thickness in a range on the order of 2 to 150 mils and a width in a range on the order of ⅛ inch to 3 inches.

7. The material as recited in claim 1, wherein at least some of the ribbons include continuous carbon, glass, boron and/or ceramic fibers.

8. The material as recited in claim 1, wherein at least some of the ribbons include continuous synthetic fibers.

9. The material as recited in claim 1, wherein at least some of the ribbons are solid metal ribbons.

10. The material as recited in claim 1, wherein at least some of the ribbons include metal powder and/or metal filaments.

11. The material as recited in claim 1, wherein a major portion of the 0 degree ribbons are of a first material and a major portion of the 90 degree ribbons are of a second material interlaced in a pattern with a major portion of the first material on one side of the interlaced material and a major portion of the second material on an opposite side of the interlaced material.

12. The material as recited in claim 11, wherein the first material is metallic and the second material is electrically insulating.

13. The material as recited in claim 11, wherein the material is of elongated tubular seamless construction and at least some of the 90 degree ribbons are ribbon portions formed by a single continuous helically extending ribbon extending at a slightly inclined angle to the axis of the tubular material.

14. The material as recited in claim 1, wherein the material is of flexible planar construction.

15. The material as recited in claim 1, wherein the matrix bonds the interlaced ribbons together and forms a material of integral construction.

16. The material as recited in claim 15, wherein the integral material is of elongated tubular seamless construction and at least some of the 90 degree ribbons are ribbon portions formed by a single respective continuous helically extending ribbon extending at a slightly inclined angle to the axis of the tubular material.

17. The material as recited in claim 15, wherein the integral material is of planar construction.

18. The material as recited in claim 15, wherein the integral material is of contoured construction.

19. The material as recited in claim 15, wherein the integral material includes separate sections having interlaced ribbons formed of different types of continuous fibers.

20. A multi-directional, light-weight, high-strength laminated material, which comprises:

a circular-machine-formed first layer of 0 degree and 90 degree elongated flat ribbons interlaced in over-and-under symmetrical relationship with respect to a plane of the first layer and with the 90 degree ribbons extending at a slightly inclined angle to the 0 degree ribbons;

at least one additional circular-machine-formed layer of 0 degree and 90 degree flat ribbons interlaced in over-and-under symmetrical relationship with respect to a plane of the at least one additional layer and with the 90 degree ribbons extending at a slightly inclined angle to the 0 degree ribbons;

at least some of the elongated 0 degree and 90 degree ribbons of each layer comprising continuous unidirectional fibers pre-impregnated with a matrix so that substantially all of the continuous fibers are encapsulated in the matrix, and the elongated 0 degree and 90 degree ribbons of each layer having the continuous fibers extending in only longitudinal directions in said 0 degree and 90 degree ribbons, respectively;

the layers of 0 degree and 90 degree ribbons being in superimposed relationship with respect to one another; and the 0 degree and 90 degree ribbons of each layer being integrally bonded to each other and the 0 degree and 90 degree ribbons of each adjacent layer by the matrix.

21. A multi-directional, light-weight high-strength laminated material, as recited in claim 20, wherein the interlaced ribbons of at least one layer extend at an angle to the interlaced ribbons of at least one other layer which is greater than the slightly inclined angle at which the 90 degree ribbons extend with respect to the 0 degree ribbons in each layer.

22. A multi-directional, light-weight, high-strength laminated material, as recited in claim 20, wherein the interlaced ribbons of at least one layer are offset with respect to the interlaced ribbons of at least one other layer.

23. A multi-directional, light-weight, high-strength laminated material, as recited in claim 22, wherein at least some of the interlaced ribbons of at least one layer are of different construction than at least some of the interlaced ribbons of at least one of the other layers.

24. A circular-machine-interlaced material of multi-directional, light-weight, high-strength, integral flexible construction, which comprises:

a plurality of spaced continuous elongated ribbons of continuous unidirectional fibers extending in interlaced over-and-under symmetrical relationship with respect to a plane of the material in approximately 0 degree and 90 degree directions, respectively, with the 90 degree ribbons extending at a slightly inclined angle to the 0 degree ribbons;

said elongated fibers in the 0 degree ribbons extending only in a longitudinal direction in the 0 degree ribbons and the elongated fibers in the 90 degree ribbons extending only in a longitudinal direction in the 90 degree ribbons; and a matrix bonding the ribbons of continuous unidirectional fibers, the matrix also impregnating the fibers of each ribbon and covering exterior surfaces of the ribbons to provide the integral flexible material.

25. The material of claim 24, wherein the matrix is a thermoplastic.

26. The material of claim 24, wherein the matrix is a thermosetting plastic.

27. The material of claim 24, wherein the matrix is a ceramic.

28. A circular-machine-interlaced material of multi-directional, light-weight, high-strength construction, which comprises:
   a plurality of 0 degree and 90 degree elongated flat ribbons interlaced in over-and-under symmetrical relationship with respect to a plane of the material so that the ribbons have sets of respective opposed engaged flat surface portions disposed in the plane of the material and the 90 degree ribbons extend at a slightly inclined angle to the 0 degree ribbons;
   at least some of the elongated 0 degree and 90 degree ribbons having fibers extending in only longitudinal directions in said at least some 0 degree and 90 degree ribbons, respectively; and
   at least some of the 0 degree and 90 degree ribbons having been being pre-impregnated with a matrix so that substantially all of the fibers of the respective ribbons are encapsulated in the matrix and substantially the entire surface area of each of the opposed engaged flat surface portions of each set of said opposed engaged flat surface portions of the respective ribbons is coated with the matrix.

29. A circular-machine-interlaced fabric of flat tapes of polymeric material reinforced with continuous filaments in both the warp and weft directions, said warp and weft tapes being interlaced in over-and-under symmetrical relationship with respect to a plane of the fabric, with the warp and weft tapes having sets of opposed flat surface portions disposed in the plane of the fabric and the weft tapes extending at a slightly inclined angle to the warp tapes, and said warp and weft tapes having edges that are abutting substantially throughout the fabric.

30. A composite of the fabric of claim 29.

31. The material as recited in claim 1, wherein the 0 degree ribbons are disposed in tightly abutted relationship, and the 90 degree ribbons are disposed in tightly abutted relationship.

32. A multi-directional, light-weight, high-strength laminated material, as recited in claim 20, wherein the 0 degree ribbons are disposed in tightly abutted relationship, and the 90 degree ribbons are disposed in tightly abutted relationship.

33. The material of claim 24, wherein the 0 degree ribbons are disposed in tightly abutted relationship, and the 90 degree ribbons are disposed in tightly abutted relationship.

34. The material of claim 28, wherein the 0 degree ribbons are disposed in tightly abutted relationship, and the 90 degree ribbons are disposed in tightly abutted relationship.

35. The fabric of claim 29, wherein the warp tapes are disposed in tightly abutted relationship, and the weft tapes are disposed in tightly abutted relationship.

36. A composite of the fabric of claim 35.

* * * * *

UNITED STATES PATENT AND TRADEMARK OFFICE
CERTIFICATE OF CORRECTION

PATENT NO. : 5,082,701

DATED : January 21, 1992

INVENTOR(S) : Paul T. CRAVEN et al.

It is certified that error appears in the above-identified patent and that said Letters Patent is hereby corrected as shown below:

On the Title page, item [75], in the listing of the inventors, the inventor's name "Paul t. Craven" should read --Paul T. Craven--; and after "Providence", the "," should be deleted and --; Andrew J. MacGowan, Newport;-- should be inserted, and "both" should read --all--.

In the Abstract, line 14, "form" should read --from--.

In column 5, line 20, "matrix-impregnate" should read --matrix-impregnated--.

UNITED STATES PATENT AND TRADEMARK OFFICE
CERTIFICATE OF CORRECTION

PATENT NO. : 5,082,701
DATED : January 21, 1992
INVENTOR(S) : Paul T. Craven, et. al.

It is certified that error appears in the above-indentified patent and that said Letters Patent is hereby corrected as shown below:

IN column 6, line 68, "fat" should read --flat--.

Signed and Sealed this

Fifteenth Day of June, 1993

Attest:

MICHAEL K. KIRK

Attesting Officer     Acting Commissioner of Patents and Trademarks